(12) United States Patent
Mohandas et al.

(10) Patent No.: US 9,007,893 B2
(45) Date of Patent: Apr. 14, 2015

(54) LAYERED THIRD PARTY APPLICATION SOFTWARE REDUNDANCY IN A NON-HOMOGENOUS VIRTUAL CHASSIS

(71) Applicants: Sindhu K. Mohandas, Thousand Oaks, CA (US); Abhishek Sinha, Woodland Hills, CA (US)

(72) Inventors: Sindhu K. Mohandas, Thousand Oaks, CA (US); Abhishek Sinha, Woodland Hills, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 213 days.

(21) Appl. No.: 13/847,883

(22) Filed: Mar. 20, 2013

(65) Prior Publication Data

US 2014/0286345 A1 Sep. 25, 2014

(51) Int. Cl.
| | |
|---|---|
| *H04L 12/26* | (2006.01) |
| *H04L 12/947* | (2013.01) |
| *H04Q 3/545* | (2006.01) |
| *H04L 12/703* | (2013.01) |

(52) U.S. Cl.
CPC .............. *H04L 49/25* (2013.01); *H04Q 3/5455* (2013.01); *H04L 45/28* (2013.01)

(58) Field of Classification Search
CPC ....................................................... H04L 49/25
USPC .................................. 370/218, 220, 221, 401
See application file for complete search history.

(56) References Cited

U.S. PATENT DOCUMENTS

| | | | |
|---|---|---|---|
| 8,023,404 B1* | 9/2011 | Narayanan et al. ........... | 370/216 |
| 2005/0066216 A1 | 3/2005 | Hebbar et al. | |
| 2007/0183313 A1* | 8/2007 | Narayanan et al. ........... | 370/216 |
| 2009/0086620 A1* | 4/2009 | Fowler et al. ................ | 370/216 |
| 2012/0033678 A1 | 2/2012 | Page et al. | |
| 2012/0063299 A1 | 3/2012 | Narasimhan et al. | |
| 2013/0064137 A1* | 3/2013 | Santoso et al. ................ | 370/254 |
| 2013/0077621 A1* | 3/2013 | Da Silva et al. .............. | 370/355 |

OTHER PUBLICATIONS

International Searching Authority; International Search Report and Written Opinion; International Application No. PCT/US14/024037; Mar. 12, 2014; 7 pgs.

* cited by examiner

*Primary Examiner* — Brian D Nguyen
*Assistant Examiner* — Toan Nguyen
(74) *Attorney, Agent, or Firm* — Garlick & Markison

(57) ABSTRACT

Layered third-party (enhanced) application software redundancy is provided in a non-homogeneous virtual chassis including two or more switches coupled via a virtual fabric link. A virtual chassis management module within at least one of the switches discovers the other switches within the virtual chassis, determines a base master switch from all of the switches in the virtual chassis, detects an enhanced application installed on at least one enhanced switch and determines an enhanced master switch from the enhanced switches.

20 Claims, 6 Drawing Sheets

LAYERED THIRD PARTY APPLICATION SOFTWARE REDUNDANCY IN A NON-HOMOGENOUS VIRTUAL CHASSIS

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to virtual chassis architectures.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge nodes. Different types of edge networks include digital subscriber line, hybrid fiber coax (HFC), fiber to the home and enterprise networks, such as campus and data center networks. Edge nodes may perform, for example, L2 switching functions for the attached devices. The edge nodes are generally connected to one or more Enterprise switches and/or end devices in the customer network, and also to an aggregate layer that terminates access links coming from multiple edge nodes. Switches residing at the aggregation layer are known as Aggregation Switches. Aggregation Switches may perform, for example, L2 switching and L3 routing of traffic received via the aggregate links from the edge nodes. The aggregate layer is connected to a metro or core network layer that performs Layer 3/IP routing of traffic received from the Aggregation Switches (in a three tier network) or from edge nodes (in a two tier network). As will be appreciated, nodes at each incremental layer of the network typically have larger capacity and faster throughput.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network.

In one known solution, a virtual chassis may be used to provide redundancy, while also providing increased throughput and bandwidth. Within a virtual chassis, two or more physical Ethernet switches can be "stacked" to form a single logical form factor with a unified control plane and configuration file. Route and switch engine redundancy are managed by a virtual chassis master switch through the creation and maintenance of synchronized forwarding tables and the exchange of control information between counterpart/peer applications running on the switches.

However, in traditional virtual chassis, each switch is provided with the same hardware and software to enable redundancy throughout the virtual chassis. For customers that require third-party (enhanced) hardware and/or software to provide additional features and/or services, installing the enhanced hardware and/or software on each switch within the virtual chassis may significantly increase the overall cost of deployment. To reduce the cost, customers may prefer to install the enhanced hardware and/or software on only a subset of the virtual chassis switches. However, since the current virtual chassis management protocols require a single master switch, such a non-homogenous virtual chassis is not possible.

Accordingly, there is a need for systems and methods for configuring a non-homogeneous virtual chassis to provide application specific redundancy.

DETAILED DESCRIPTION OF THE INVENTION

Figure 1:
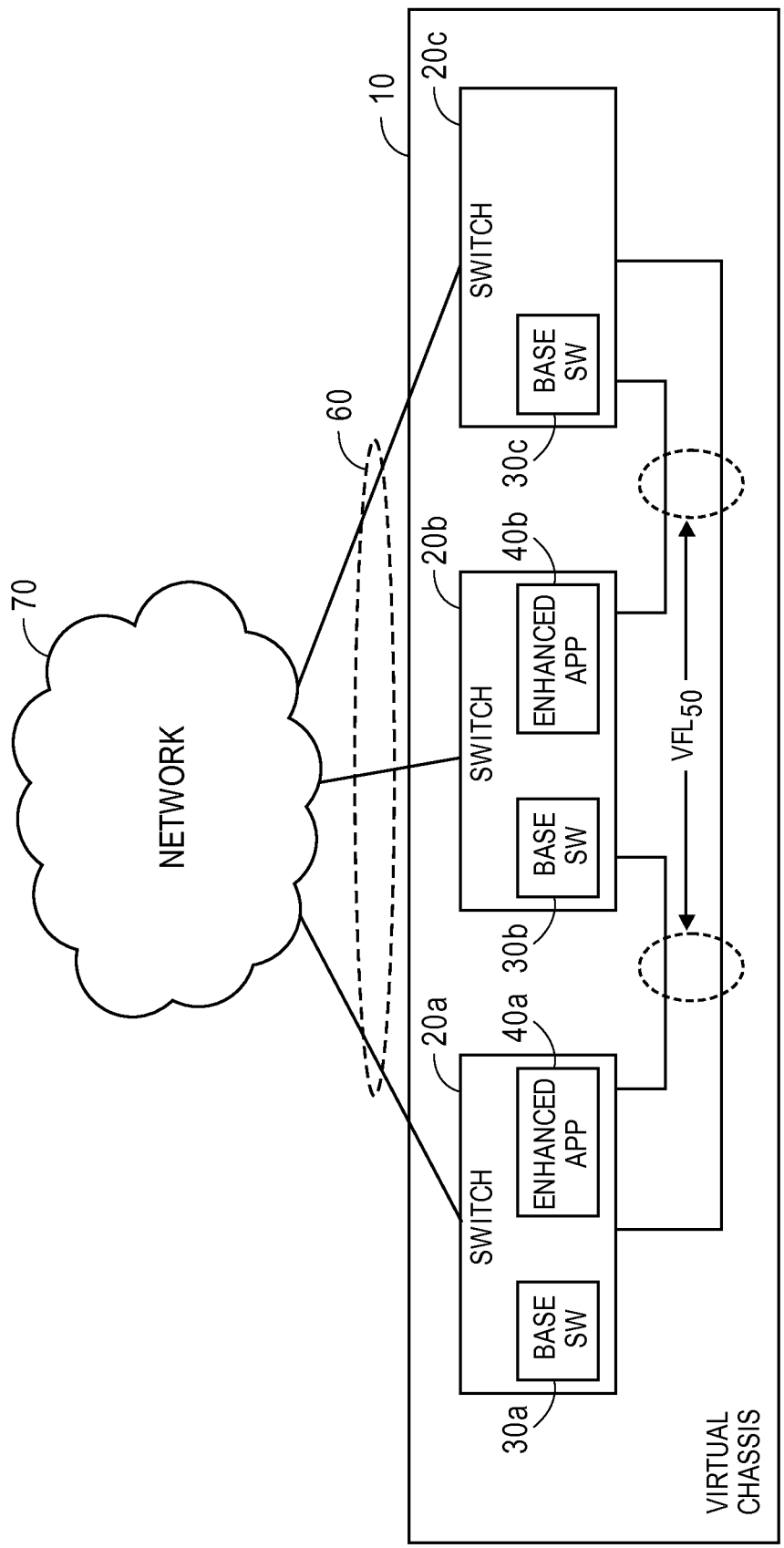
FIG. 1 illustrates a schematic block diagram of an embodiment of a virtual chassis in accordance with the present invention.

FIG. 1 illustrates an embodiment of a virtual chassis 10 in accordance with the present invention. The virtual chassis 10 includes two or more Ethernet switches (three switches 20a-20c being shown for simplicity) that collectively form a single logical switch. Thus, the virtual chassis 10 has a Media Access Control (MAC) address and Internet Protocol (IP) address used by external nodes to forward traffic to the virtual chassis 10. Each switch 20a-20c within the virtual chassis 10 is further assigned a unique identifier (i.e., IP address or other internal identifier for communication between the software components residents on the switches) used for routing between the switches 20a-20c.

The Ethernet switches 20a-20c are coupled together via a virtual fabric link (VFL) 50. The VFL 50 provides a connection for exchange of information between the switches 20a-20c regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of links connecting the virtual chassis 10 to other upstream/downstream nodes. MAC address/forwarding tables for external nodes are maintained in each switch 20a-20c that enable bridging or routing packets between switches 20a-20c to reach external destination devices. For example, when a packet is to be routed from one switch (e.g., switch 20a) to another switch (e.g., switch 20b) within the virtual chassis 10 for transmission to an external destination device, a pre-pended header is added to the packet that includes the identifier of source switch 20a and the identifier of the destination switch 20b.

The switches 20a-20c are separate physical switches, each operable as a stand-alone switch. The switches 20a-20c may be encased together in a single physical chassis or in two or more separate physical chasses. Depending on the chassis configuration, the switches 20a-20c may be in the same geographic area, such as in a central office or data center, or may be separate geographic locations, such as different buildings or cities, to provide geo diversity.

In addition, the switches 20a-20c within the virtual chassis 10 may be Aggregate switches, Edge switches or Enterprise switches. In embodiments in which the switches 20a-20c are Enterprise switches, the virtual chassis 10 is connected downstream to one or more end devices within a Local Area Network (LAN) and upstream to one or more Edge switches. In embodiments in which the switches 20a-20c are Edge switches, the virtual chassis 10 is connected downstream to one or more Enterprise switches and/or end devices within a LAN or home network and upstream to one or more Aggregate switches or network nodes, such as network switches and/or routers within a metro/core network 70. In embodiments in which the switches 20a-20c are Aggregate switches, the virtual chassis 10 is connected downstream to one or more Edge switches and upstream to one or more network nodes within network 70.

In an embodiment, the connection between the virtual chassis 10 and an upstream or downstream node is formed by a multi-chassis link aggregation group (MC-LAG) 60, in which two or more physical links connect a particular node with two or more of the switches 20a-20c within the virtual chassis, as described in U.S. patent application Ser. No. 13/010,169, entitled "System and Method for Multi-Chassis Link Aggregation," filed on Jan. 20, 2011, which is incorporated herein by reference. For example, as shown in FIG. 1, a respective external physical link connects each of the switches 20a-20c to a particular network node (not shown) within the metro/core network 70 to form a MC-LAG 60. In an exemplary embodiment, the virtual chassis 10 and/or network node may use load balancing techniques to distribute traffic across all of the available links of the MC-LAG 60. For example, for each packet transmitted over the MC-LAG 60, one of the physical links is selected based on a load-balancing algorithm (typically involving a hash function operating on the source and destination Internet Protocol (IP) or Media Access Control (MAC) address information).

In another embodiment, the switches 20a-20c may be connected to upstream and/or downstream nodes using standard Link Aggregation Groups (LAGs) or other trunks or links. It should be understood that as used herein, the term "LAG" refers to the bundling of several physical links between two nodes to form a single logical channel therebetween using the Link Aggregation Control Protocol (LACP), as defined in IEEE 802.1AX-IEEE 802.3ad released on Nov. 3, 2008.

Regardless of the type of connection between the virtual chassis 10 and the upstream and/or downstream nodes, the switches 20a-20c operate transparently to the upstream and downstream nodes and are treated as a single logical device (virtual chassis 10) by the upstream and downstream nodes. Therefore, the upstream and downstream nodes are able to actively forward traffic to the virtual chassis 10, while the synchronization of MAC address tables and other forwarding information between the switches 20a-20c is driven by L2 packet flows and control messaging over the VFL 50.

In one embodiment, the switches 20a-20c are operating in an active/passive environment, in which not all of the external links are actively forwarding traffic at the same time (i.e., the external links on one switch are active, while the external links on other switches remain passive or "on standby"). In this embodiment, Spanning Tree Protocol (STP) may be used to bring an alternate path out of the standby mode and into an active state to re-establish a connection upon failure of an active link. In another embodiment, the switches 20a-20c are operating in an active/active environment, in which all external links are simultaneously active (i.e., the external links on all switches are active). In this embodiment, STP may not need to be run in some or all portions of the network topology for loop prevention (e.g., STP may still be utilized over the VFL 50 as well as over the links connecting the virtual chassis 10 to upstream/core switches within the network 70).

In accordance with embodiments of the present invention, each switch 20a-20c is provided with base software 30a-30c that includes the base operating system and all of the base applications necessary to provide base features and/or services (i.e., L2 switching and/or L3 routing of traffic). In addition, an enhanced application 40a/40b may also be installed on one or more of the switches (e.g., switches 20a and 20b) to enable the virtual chassis 10 to provide an enhanced feature and/or service that is different from any of the base features and/or services. For example, in one embodiment, the enhanced application 40a/40b is a Wireless Local Area Network (WLAN) controller application that controls one or more Access Points (APs) within a WLAN. In other embodiments, the enhanced application 40a/40b may be any application that provides a service/feature over and above the base services/features.

In a homogeneous virtual chassis, the enhanced application 40a/40b is installed on each switch within the virtual chassis. In a non-homogeneous virtual chassis, as is shown in FIG. 1, the enhanced application 40a/40b is installed on only a subset of the switches 20*a*/20*b*. In this embodiment, the switches 20*a* and 20*b* on which the enhanced application are installed are referred to herein as "enhanced switches," while the switches 20*c* not having the enhanced application installed thereon are referred to herein as "base switches."

It should be noted that although not shown, multiple enhanced applications may be installed on one or more of the switches 20*a*-20*c*. In addition, each enhanced application may be installed on a respective subset of switches that may be different from one or more other subsets of switches on which other enhanced applications are installed. Each enhanced application is configured within the virtual chassis to provide a respective layer of application specific redundancy for each enhanced application.

For example, in an exemplary embodiment, upon initialization of the virtual chassis 10, a base master election process is initiated within the virtual chassis 10 to elect a base master switch (e.g., switch 20*c*) from all of the switches 20*a*-20*c* within the virtual chassis 10. The base master switch 20*c* is the central point of management (configuration and monitoring) for the virtual chassis 10 and all applications running on the switches 20*a*-20*c* within the virtual chassis, including the enhanced application 40*a*/40*b*, which may not be running on the base master switch 20*c* (as shown in FIG. 1). For example, the base master switch 20*c* is responsible for controlling load sharing, switching/routing and communication related to the base software 30*a*-30*c* between the switches 20*a*-20*c* and to facilitate redundancy of the base software 30*a*-30*c* within the virtual chassis. The base master election process may utilize, for example, a conventional virtual chassis master election algorithm that considers various election criteria, such as which switch has the lowest identifier/address, which switch has the lowest priority, and/or other criteria, to elect the base master switch 20*c*. The base master switch 20*c* may be a base switch (that does not have the enhanced application installed thereon) or an enhanced switch, depending upon the base master election process used.

In addition, an enhanced master switch (e.g., switch 20*a*) is elected from the enhanced switches 20*a* and 20*b* (having the enhanced application 40*a*/40*b* installed thereon) using an enhanced master election process. The enhanced master switch 20*a* is responsible for controlling load sharing, switching/routing and communication related to the enhanced application 40*a*/40*b* between the enhanced switches 20*a* and 20*b* and to facilitate redundancy of the enhanced application 40*a*/40*b* within the virtual chassis. It should be noted that redundancy is only provided if the enhanced application is installed on more than one switch 20. However, the enhanced master election process of the present invention will operate as long as at least one switch, but less than all switches, has an enhanced application installed thereon.

The enhanced master switch may be the same as the base master switch (if the base master switch has the enhanced software installed thereon) or different from the base master switch. The enhanced master election process may utilize, for example, a virtual chassis enhanced master election algorithm that considers election criteria similar to that considered by the base master election process and/or different election criteria.

It should be understood that a separate enhanced master switch is elected for each enhanced application in the virtual chassis 10 using the same or different enhanced master election algorithms. The enhanced master switch may be different for each enhanced application, the same for all enhanced applications or the same for only certain enhanced applications, depending on the switch attributes (i.e., the enhanced applications installed on each switch, the MAC address and priority of each switch) and other election criteria. Each enhanced master switch represents an additional redundancy layer within the virtual chassis, in that upon failure of a particular switch within the virtual chassis, the base master switch and each enhanced master switch for each enhanced application installed on the failed switch re-routes traffic related to their respective base/enhanced application and updates their forwarding tables accordingly. Thus, a separate redundancy layer is virtually created for each enhanced application on top of the base software redundancy based on the enhanced applications 40*a*/40*b* installed on each of the constituent switches 20*a*-20*c* of the virtual chassis 10.

Figure 2A:
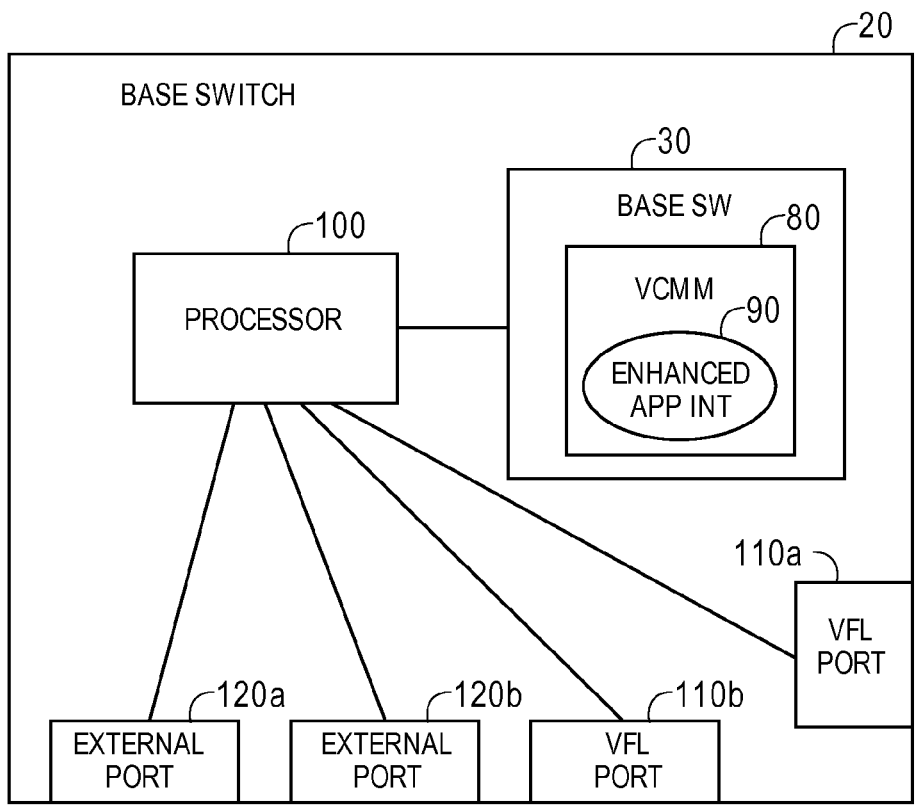
FIG. 2A illustrates a schematic block diagram of an embodiment of a base switch within a virtual chassis in accordance with the present invention.

FIG. 2A illustrates an exemplary embodiment of a base switch. The base switch 20 includes a processor 100, the base software 30, one or more Virtual Fabric Link (VFL) ports 110*a* and 110*b* and one or more external ports 120*a* and 120*b*. As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein.

The VFL ports 110*a* and 110*b* provide connections to links that form the VFL. The external ports 120*a* and 120*b* provide connections to links to external upstream and/or downstream nodes. One or more of the external ports 120*a* and 120*b* may include member ports for a MC-LAG physical link, LAG or other trunk group, fixed link, etc. The VFL ports 110*a* and 110*b* and external ports 120*a* and 120*b* may have the same physical interface type, such as copper ports (CAT-5E/CAT-6), multi-mode fiber ports (SX) or single-mode fiber ports (LX). In another embodiment, the VFL ports 110*a* and 110*b* and external ports 120*a* and 120*b* may have one or more different physical interface types.

The base software 30 includes a virtual chassis management module (VCCM) 80 that enables configuration of the switches in the virtual chassis upon initialization of the base switch 20 and/or other switches within the virtual chassis. The VCCM 80 includes an enhanced application interface 90 for communicating with the enhanced switches within the virtual chassis.

The VCCM 80 is executable by the processor 100 to communicate with other switches in the virtual chassis via one or more VFL ports 110*a* and 110*b* to run a topology discovery process that discovers each switch within the virtual chassis and various attributes of each switch (e.g., identifier of each switch, switch priority, etc.). The VCCM 80 is further executable by the processor to run a base master election process that elects a base master switch based on the switch attributes of each switch and/or other election criteria.

For example, in an exemplary operation, upon initialization, the VCCM 80 boots up the base switch 20 in a virtual chassis mode based on a configuration file for the virtual chassis. It should be noted that the configuration file contains configurations for the base software applications and the enhanced software applications to ensure that if any unit becomes the master (base or enhanced), the configuration is present in the system 10 for all applications. The configuration of the enhanced application is hosted or stored as part of the enhanced application interface 90 present on the base switch 20.

The virtual chassis mode is a stand-alone boot process in which the base switch boots up independently of all other switches in the virtual chassis to bring up all of the standard applications in the base software 30 and the VFL ports 110*a*/

110*b* (the external ports 120*a*/120*b* are not brought up in the virtual chassis mode). When the VCCM 80 detects that all switches within the virtual chassis have completed the virtual chassis boot process, the VCCM 80 initiates the topology discovery process, followed by the base master election process. If the base switch is elected the base master switch, the VCCM 80 further provides the MAC address and IP address of the virtual chassis to each switch within the virtual chassis. If the base switch is not elected the base master switch (i.e., the base switch is a base slave switch), the base slave switch receives the MAC address and IP address of the virtual chassis from the base master switch and distributes the MAC address and IP address of the virtual chassis to all base software applications within the base software 30.

As part of the topology discovery process, the VCCM 80 may detect the presence of one or more enhanced switches having one or more enhanced applications installed thereon within the virtual chassis. In an embodiment in which the base switch 20 is elected the base master switch, the VCCM 80 notifies the enhanced application interface 90 of the presence of one or more enhanced switches in the virtual chassis. This triggers, for example, a state machine within the enhanced application interface 90 to receive configuration information for the enhanced applications within the virtual chassis and open a socket to wait for a connection from corresponding enhanced application interfaces within each of the enhanced switches via the VFL ports 110*a*/110*b*.

Upon detecting connections therefrom, the enhanced application interface 90 determines on which switches each enhanced application is installed. From this information and the topology information, the enhanced application interface 90 executes an enhanced master election process that elects an enhanced master switch for each enhanced application. The enhanced master switch may be different for each enhanced application or the same for more than one of the enhanced applications as long as the enhanced master switch selected for a particular enhanced application has that particular enhanced application installed thereon. The enhanced application interface 90 then provides the internal IP address or other identifier of the enhanced master switch(es) to each enhanced switch. It should be understood that each enhanced switch only receives the IP addresses of the enhanced master switches associated with the enhanced applications installed thereon.

Figure 2B:
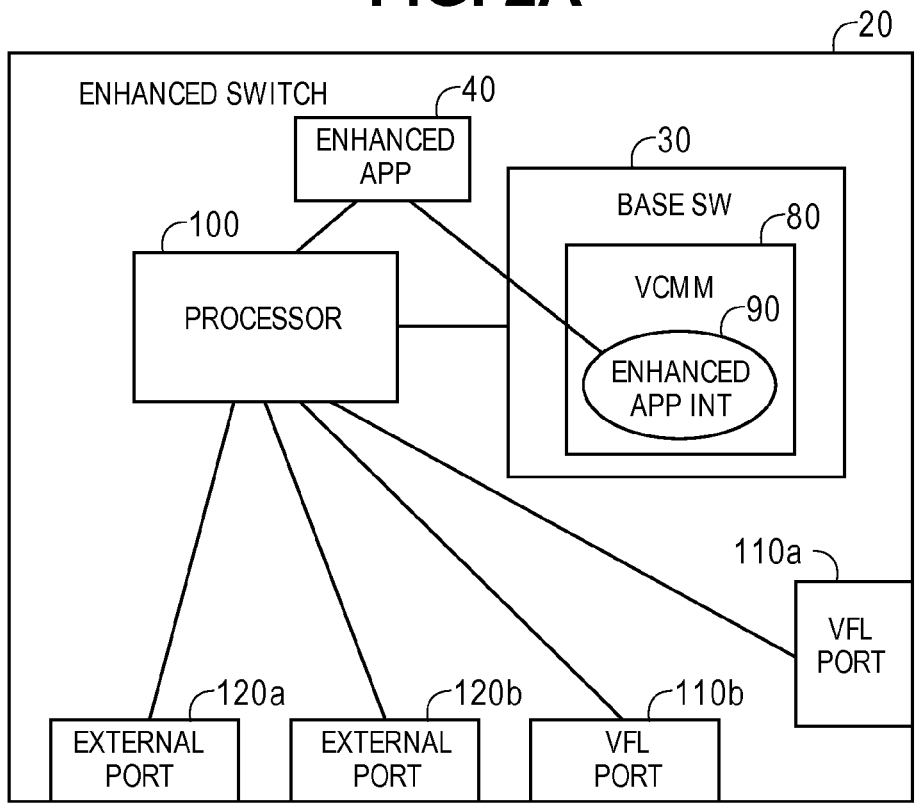
FIG. 2B illustrates a schematic block diagram of an embodiment of an enhanced switch within a virtual chassis in accordance with the present invention.

FIG. 2B illustrates an exemplary embodiment of an enhanced master switch 20. The enhanced master switch 20 includes a processor 100, the base software 30, an enhanced application 40, one or more Virtual Fabric Link (VFL) ports 110*a* and 110*b* and one or more external ports 120*a* and 120*b*. The VFL ports 110*a* and 110*b* provide connections to links that form the VFL. The external ports 120*a* and 120*b* provide connections to links to external upstream and/or downstream nodes. One or more of the external ports 120*a* and 120*b* may include member ports for a MC-LAG physical link, LAG or other trunk group, fixed link, etc. The VFL ports 110*a* and 110*b* and external ports 120*a* and 120*b* may have the same physical interface type, such as copper ports (CAT-5E/CAT-6), multi-mode fiber ports (SX) or single-mode fiber ports (LX). In another embodiment, the VFL ports 110*a* and 110*b* and external ports 120*a* and 120*b* may have one or more different physical interface types.

The base software 30 includes the VCCM 80, which also includes the enhanced application interface 90, as described above. The VCCM 80 is executable by the processor 100 to communicate with other switches in the virtual chassis via one or more VFL ports 110*a* and 110*b* to run the topology discovery process and the base master election process, as also described above. Furthermore, upon initialization, the VCCM 80 boots up the enhanced switch 20 in the virtual chassis mode, as further described above. However, as part of the virtual chassis boot process, the enhanced switch 20 also boots up the enhanced application 40 and connects the enhanced application 40 to the enhanced application interface 90.

When the VCCM 80 detects that all switches within the virtual chassis have completed the virtual chassis boot process, the VCCM 80 initiates the topology discovery process, followed by the base master election process. In an embodiment in which the enhanced switch 20 is elected the base master switch, the VCCM 80 further executes the enhanced master election process, as described above.

However, in an embodiment in which the enhanced switch is not elected the base master switch (i.e., the enhanced switch is a base slave switch), the base slave switch receives the MAC address and IP address of the virtual chassis from the base master switch and distributes the MAC address and IP address of the virtual chassis to all base software applications within the base software 30 and to the enhanced application 40.

The enhanced application interface 90 then connects to the corresponding enhanced application interface in the base master switch via the VFL ports 110*a*/110*b*. The enhanced application interface 90 then receives from the base master switch the IP address of the enhanced master switch for the enhanced application 40 (i.e., an internal IP address used only within the virtual chassis), along with the internal IP addresses of each enhanced switch on which the enhanced application 40 is installed.

In an embodiment in which the enhanced switch is the enhanced master switch, the enhanced application interface 90 opens a socket and waits for a connection from each of the enhanced slave switches within the virtual chassis. Upon detecting connections therefrom, the enhanced application 40 uses the IP address information of the enhanced switches to connect to all of the instances of the enhanced application 40 installed in the virtual chassis, forming an IP connection therebetween for control communication and redundancy. In an embodiment in which the enhanced switch is an enhanced slave switch, the enhanced application interface 90 will connect to the enhanced application interface on the enhanced master switch to form an IP connection between the enhanced applications 40 on the enhanced master/slave switches.

In an exemplary embodiment, the enhanced master switch communicates with the enhanced application interface 90 on the base master switch for configuration and management. For example, the enhanced master switch can verify the enhanced image/configuration with the enhanced application interface 90 on the base master switch and receive the correct enhanced configuration information from the enhanced application interface 90 on the base master switch if the image/configuration does not match. The enhanced master switch further communicates with the enhanced slave switches for run time configuration and run time state synchronization.

Figure 3A:
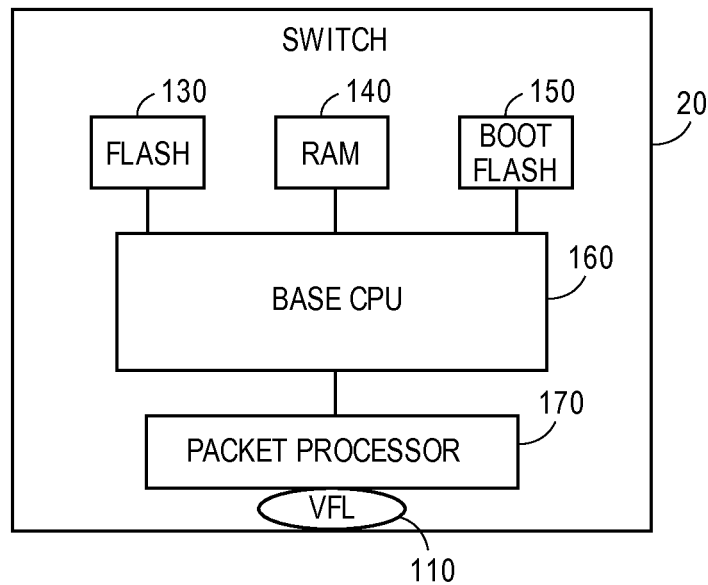
FIG. 3A illustrates a schematic block diagram of an embodiment of various hardware components of a switch within a virtual chassis in accordance with the present invention.

FIG. 3A illustrates an exemplary embodiment of various hardware components of a switch 20 within a virtual chassis. The switch 20 includes a base CPU 160, packet processor 170, one or more VFL ports 110, one or more external ports (not shown) and one or more memory devices. For example, as shown in FIG. 3A, the switch 20 may include a flash memory 130, random access memory 140 and boot flash memory 150. However, it should be understood that any type of memory device may be included. By way of example, but not limitation, the memory device(s) may include one or more a data storage device, random access memory (RAM), read only memory (ROM), flash memory, compact disc, floppy disc, ZIP™ drive, tape drive, database or other type of storage device or storage medium.

Upon initialization, the base CPU 160 accesses the boot flash 150 to load the base image (i.e., base software applications) stored in the boot flash 150 and bring up the VFL ports 110 for communication with other switches within the virtual chassis. It should be understood that base image includes the enhanced application interface that is provided with the configuration of any enhanced applications within the virtual chassis. In an embodiment in which the switch 20 is an enhanced switch, the base CPU 160 further loads the enhanced image (i.e., enhanced application) as, for example, a separate enhanced application virtual machine (VM) or a separate application process on the base CPU 160, and the enhanced application interface pushes the enhanced application configuration to the enhanced application, as shown in FIG. 2B. Thereafter, the VFL 110 is turned on and the packet processor 170 generates and processes packets transmitted and received over the VFL 110 to execute the topology discovery process, base master election process and enhanced master election process (if applicable).

Figure 3B:
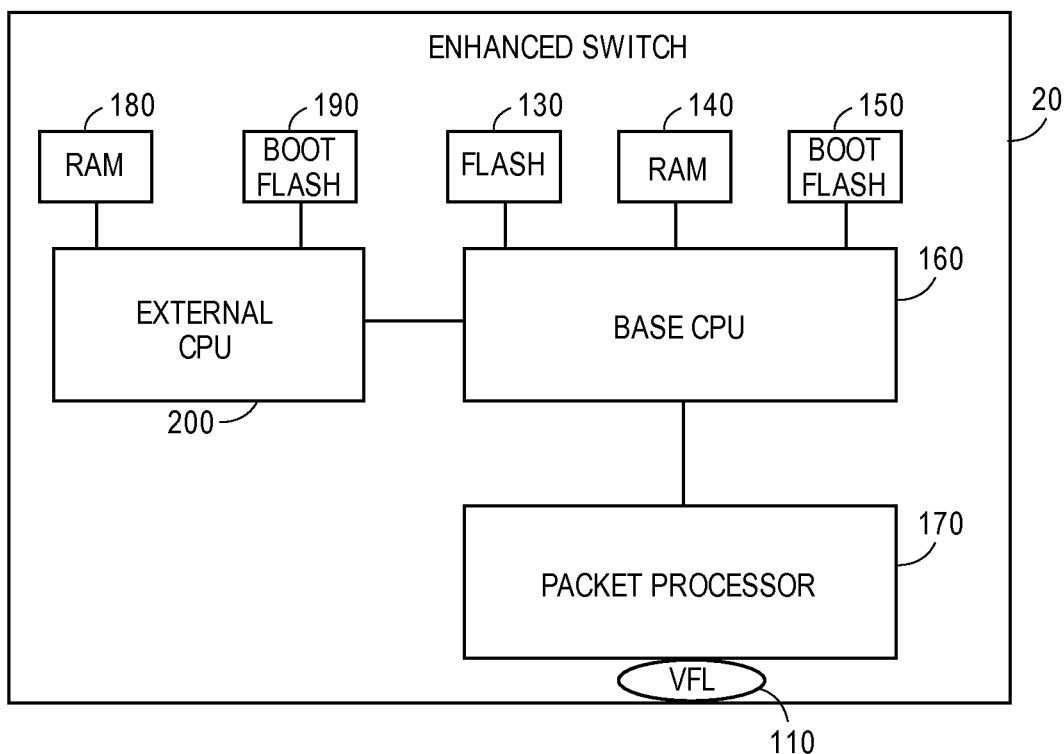
FIGS. 3B and 3C illustrate schematic block diagrams of embodiments of various hardware components of an enhanced switch within a virtual chassis in accordance with the present invention.
Figure 3C:
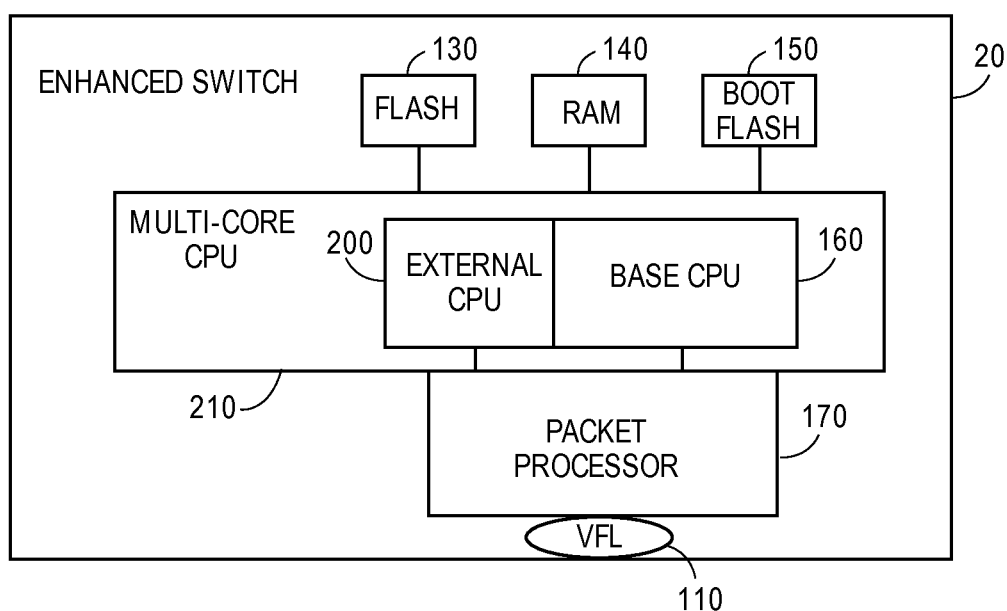

Other hardware configurations for an enhanced switch are shown in FIGS. 3B and 3C. In FIG. 3B, the enhanced switch 20 includes an external CPU 200, additional RAM 180 and an additional boot flash memory 190 for the enhanced application. The base CPU 160 communicates with the external CPU, using for example, Transmission Control Protocol/Internet Protocol (TCP/IP), to facilitate loading of the enhanced application from the boot flash memory 190 onto the external CPU 200 and to enable communication between the enhanced application on the external CPU 200 and the enhanced application interface on the base CPU 160 (and other base software applications loaded thereon). Since the enhanced application is loaded onto an external CPU 200, the internal IP address of the enhanced application is the IP address of the external CPU 200.

In FIG. 3C, a multi-core CPU 210 is provided including both the base CPU 160 and the external CPU 200. In this exemplary hardware embodiment, the base CPU 210 facilitates loading of the enhanced application from the boot flash memory 150 onto the external CPU 200. In addition, the internal IP address of the enhanced application is the IP address of the external CPU 210. It should be understood that there are many different hardware configurations possible for the Ethernet switches within the virtual chassis, and the present invention is not limited to any particular hardware configuration.

Figure 4:
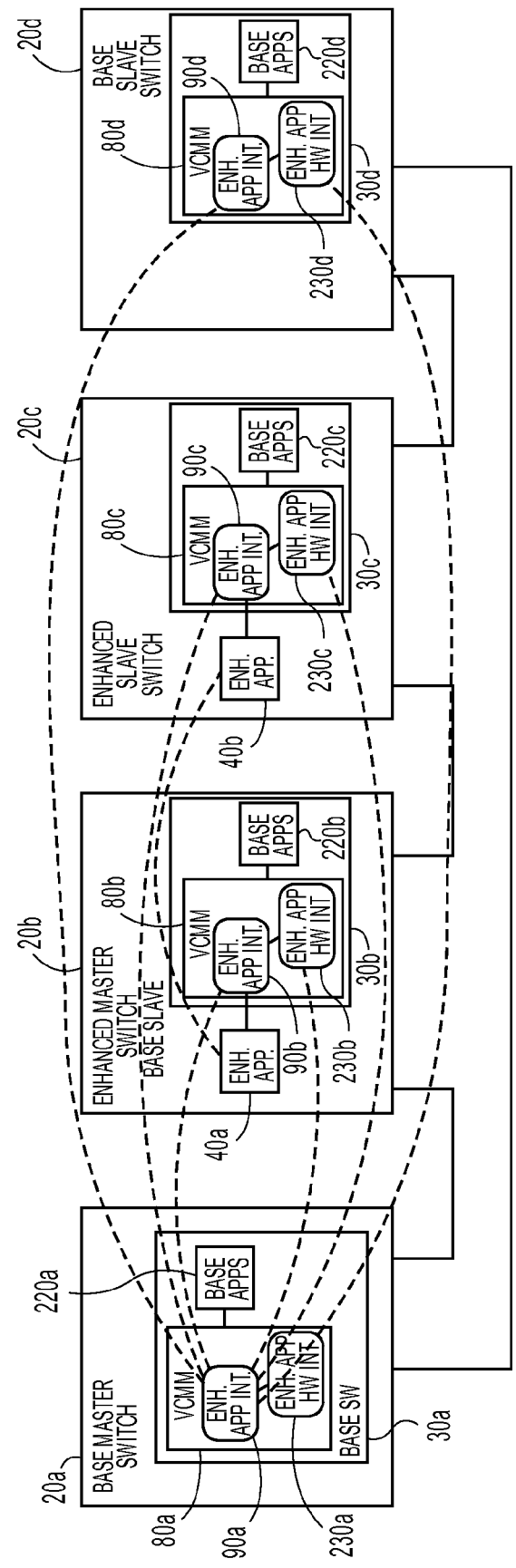
FIG. 4 illustrates a schematic block diagram of an embodiment of logical communication between various software components within the virtual chassis in accordance with the present invention.

FIG. 4 illustrates a schematic block diagram of an embodiment of logical communication between various software components within the virtual chassis in accordance with the present invention. In FIG. 4, there are four Ethernet switches 20a-20d forming the virtual chassis. However, it should be understood that in other embodiments, the number of Ethernet switches can vary between two and eighteen or higher.

Each switch 20a-20d includes base software 30a-30d, which includes the VCCM 80a-80d, enhanced application interface 90a-90d, base software applications 220a-220d and enhanced application hardware interface 230a-230d. In addition, the enhanced switches 20b and 20c include an enhanced application 40a and 40b. Switch 20a is the base master switch, while switch 20b is the enhanced master switch. Switches 20b-20d are base slave switches, while switch 20c is also an enhanced slave switch.

As can be seen in FIG. 4, after initialization and installation of the base applications 220a-220d on the switches 20a-20d, the enhanced application interface 90a within the base master switch 20a establishes a connection with the enhanced application interfaces 90b-90d on each of the base slave switches and communicates with the enhanced application interfaces 90b-90c on the enhanced switches 20b-20c to elect the enhanced master switch 20b. The enhanced application interface 90a within the base master switch 20a further establishes a connection with the enhanced application hardware interfaces 230b-230d and communicates with the enhanced application hardware interfaces 230b-230c on the enhanced switches 20b-20c for hardware programming related to the enhanced application 40a-40b. Furthermore, the enhanced application 40a on the enhanced master switch 20b establishes an inter-process communication connection (IPC) with the enhanced application 40b on the enhanced slave switch 20c for control and redundancy.

Figure 5:
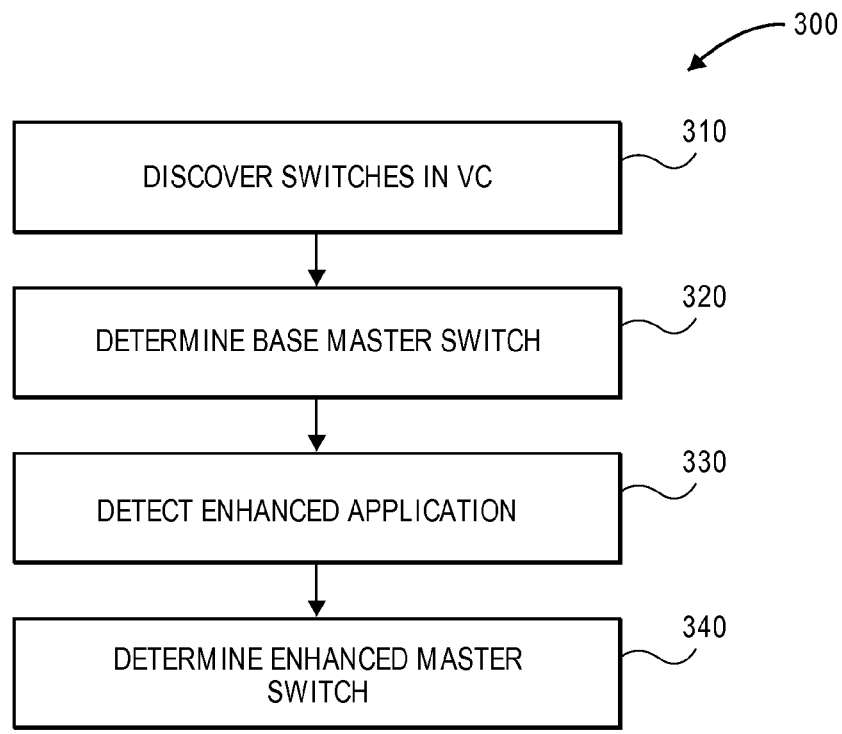
FIG. 5 illustrates an exemplary flow diagram of a method for providing application specific redundancy in a virtual chassis in accordance with the present invention.

FIG. 5 illustrates an exemplary flow diagram of a method 300 for providing application specific redundancy in a virtual chassis in accordance with the present invention. The method begins at 310, where the virtual chassis control module within each switch in the virtual chassis runs a topology discovery process to discover the switches in the virtual chassis. At 320, the virtual chassis control modules further determine a base master switch, using any type of master election process. At 330, as part of the topology discovery process, one or more enhanced applications are detected within the virtual chassis. At 340, an enhanced master switch is determined. For example, in one embodiment, the base master switch elects the enhanced master switch using any type of master election process and notifies the other switches in the virtual chassis of the identity of the enhanced master switch.

Figure 6:
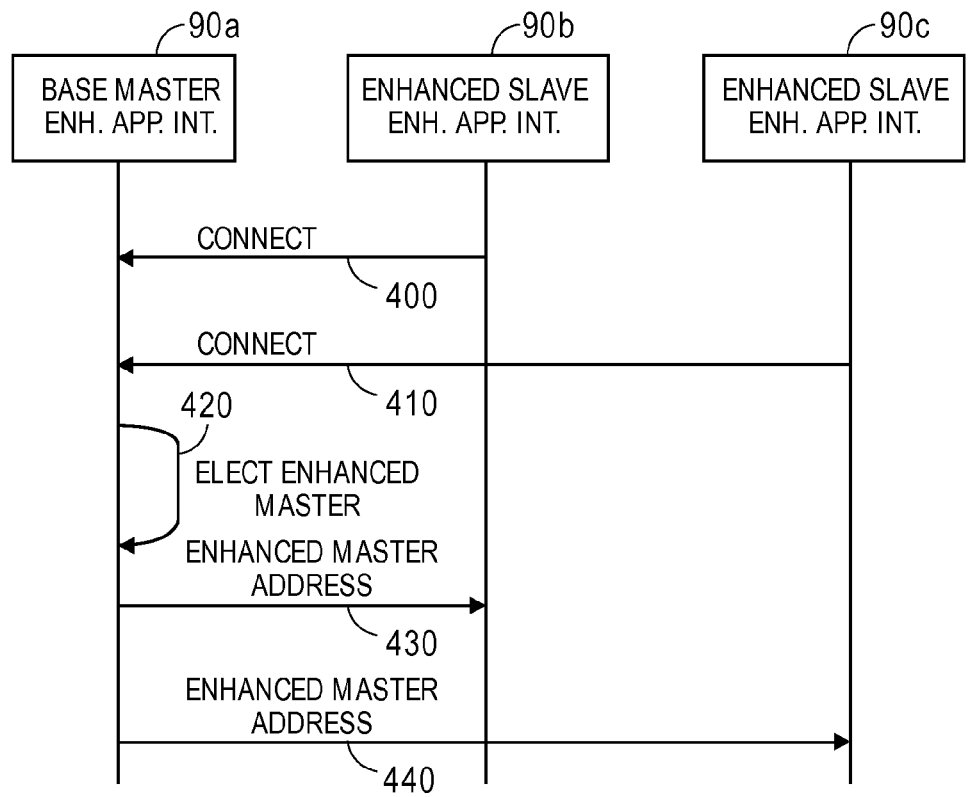
FIG. 6 illustrates an exemplary signaling diagram for providing application specific redundancy in a virtual chassis in accordance with the present invention.

FIG. 6 illustrates an exemplary signaling diagram for providing application specific redundancy in a virtual chassis in accordance with the present invention. In FIG. 6, the base master switch has already been elected and the enhanced application interface 90a on the base master switch has opened a socket awaiting a connection from the enhanced application interfaces 90b and 90c on each of the enhanced switches (which are also base slave switches). At 400 and 410, the enhanced application interfaces 90b/90c on each of the enhanced switches connect to the enhanced application interface 90a on the base master switch.

Based on the topological information previously determined, at 420, the enhanced application interface 90a on the base master switch elects an enhanced master switch. Then, at 430 and 440, the enhanced application interface 90a on the base master switch provides the internal IP address or other identifier of the enhanced master switch (i.e., the IP address of the enhanced application installed on the enhanced master switch) to the enhanced application interfaces 90b/90c on each of the enhanced switches.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A switch in a non-homogenous virtual chassis including at least two switches, the switch comprising:
    a plurality of virtual fabric link (VFL) ports coupled to a VFL, wherein the VFL interconnects each of the at least two switches within the virtual chassis;
    a plurality of base software applications;
    a virtual chassis management module for:
        discovering the at least two switches within the virtual chassis,
        determining a base master switch from the at least two switches to serve as a master for the plurality of base software applications,
        detecting an enhanced application installed on at least one enhanced switch of the at least two switches, the at least one enhanced switch including only a subset of the at least two switches, and
        determining an enhanced master switch from the at least one enhanced switch to server as a master for the enhanced application; and
    a processor for executing the base software applications and for executing the virtual chassis management module to communicate with the at least two switches via the VFL.

2. The switch of claim 1, wherein:
    the switch is the base master switch and other switches of the at least two switches are base slave switches; and
    the virtual chassis management module includes an enhanced application interface for communicating with the at least one enhanced switch via the VFL and electing the enhanced master switch from the at least one enhanced switch.

3. The switch of claim 2, wherein the enhanced application interface is notified of the presence of the at least one enhanced switch within the virtual chassis and receives configuration information for the enhanced application.

4. The switch of claim 3, wherein the enhanced application interface further communicates with additional enhanced application interfaces on each of the at least one enhanced switch via the VFL to provide an address of the enhanced master switch to each of the at least one enhanced switch and verify the configuration information for the enhanced application.

5. The switch of claim 2, wherein the virtual chassis management module further determines and communicates a Medium Access Control (MAC) address and Internet Protocol (IP) address for the virtual chassis to each of the base slave switches via the VFL.

6. The switch of claim 1, wherein:
    the switch is a first enhanced switch of the at least one enhanced switch; and
    the virtual chassis management module includes an enhanced application interface for communicating with the base master switch and each of the at least one enhanced switch via the VFL.

7. The switch of claim 6, wherein the enhanced application interface further receives an address of the enhanced master switch from the base master switch via the VFL and verifies configuration information for the enhanced application with the base master switch.

8. The switch of claim 6, wherein the enhanced application interface further receives a respective internal Internet Protocol (IP) address associated with the enhanced application installed on each of the at least one enhanced switch to enable communication between the first enhanced switch and other enhanced switches of the at least one enhanced switch via the VFL for redundancy.

9. The switch of claim 6, wherein the first enhanced switch is the enhanced master switch and other switches of the at least one enhanced switch are enhanced slave switches.

10. The switch of claim 6, further comprising:
    an additional processor configured to execute the enhanced application.

11. The switch of claim 1, wherein the switch is the base master switch and the enhanced master switch.

12. The switch of claim 1, wherein the virtual chassis management module further detects an additional enhanced application running on at least one additional enhanced switch of the at least two switches and determines an additional enhanced master switch from the at least one additional enhanced switch.

13. A non-homogenous virtual chassis, comprising:
    at least two switches, each of the at least two switches comprising:
        a plurality of virtual fabric link (VFL) ports coupled to a VFL, wherein the VFL interconnects each of the at least two switches within the virtual chassis;
        a plurality of base software applications; and
        a processor for executing the plurality of base software applications;
    wherein at least one of the at least two switches further includes a virtual chassis management module executable by processor to communicate with that least two switches via the VFL, the virtual chassis management module for:
- discovering the at least two switches within the virtual chassis;
- determining a base master switch from the at least two switches to serve as a master for the plurality of base software applications installed on each of the at least two switches;
- detecting an enhanced application running on at least one enhanced switch of the at least two switches, the at least one enhanced switch including only a subset of the at least two switches; and
- determining an enhanced master switch from the at least one enhanced switch to serve as a master for the enhanced application.

14. The non-homogenous virtual chassis of claim 13, wherein:
- the virtual chassis management module within the base master switch further includes an enhanced application interface for communicating with the at least one enhanced switch via the VFL and electing the enhanced master switch from the at least one enhanced switch.

15. The non-homogenous virtual chassis of claim 14, wherein the enhanced application interface is notified of the presence of the at least one enhanced switch within the virtual chassis, receives configuration information for the enhanced application and provides an address of the enhanced master switch to each of the at least one enhanced switch.

16. The non-homogenous virtual chassis of claim 13, wherein:
- the virtual chassis management module within an enhanced switch of the at least one enhanced switch includes an enhanced application interface for communicating with the base master switch and each of the at least one enhanced switch via the VFL.

17. The non-homogenous virtual chassis of claim 16, wherein the enhanced application interface receives a respective internal Internet Protocol (IP) address associated with the enhanced application installed on each of the at least one enhanced switch to enable communication via the VFL therebetween for redundancy.

18. The non-homogenous virtual chassis of claim 16, wherein each of the at least one enhanced switch includes an additional processor configured to execute the enhanced application.

19. The non-homogenous virtual chassis of claim 13, wherein the virtual chassis management module further detects an additional enhanced application running on at least one additional enhanced switch of the at least two switches and determines an additional enhanced master switch from the at least one additional enhanced switch, the at least one additional enhanced switch including an additional subset of the at least two switches.

20. A method for providing application specific redundancy in a non-homogenous virtual chassis, comprising:
- interconnecting at least two switches within the virtual chassis via a virtual fabric link;
- at least one of the least two switches:
  - discovering the at least two switches within the virtual chassis;
  - determining a base master switch from the at least two switches to serve as a master for a plurality of base software applications installed on each of the at least two switches;
  - detecting an enhanced application running on at least one enhanced switch of the at least two switches, the at least one enhanced switch including only a subset of the at least two switches; and
  - determining an enhanced master switch from the at least one enhanced switch to serve as a master for the enhanced application.

* * * * *